(12) United States Patent
Kim

(10) Patent No.: US 8,233,128 B2
(45) Date of Patent: Jul. 31, 2012

(54) LIQUID CRYSTAL DISPLAY MODULE

(75) Inventor: Ok-Hwan Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 232 days.

(21) Appl. No.: 12/822,642

(22) Filed: Jun. 24, 2010

(65) Prior Publication Data

US 2011/0149190 A1  Jun. 23, 2011

(30) Foreign Application Priority Data

Dec. 21, 2009  (KR) ........................ 10-2009-0128363

(51) Int. Cl.
*G02F 1/1343* (2006.01)
(52) U.S. Cl. ......... 349/152; 349/149; 349/150; 349/151
(58) Field of Classification Search ........... 349/149–152
See application file for complete search history.

(56) References Cited

FOREIGN PATENT DOCUMENTS
KR  10-2008-0048180  6/2008

*Primary Examiner* — Phu Vu

(74) *Attorney, Agent, or Firm* — Morgan, Lewis & Bockius LLP

(57) ABSTRACT

A liquid crystal display (LCD) module includes: a liquid crystal panel; a backlight unit that is below the liquid crystal panel and that includes a reflector, a light guide plate, at least one optical sheet and a light emitting diode (LED) assembly, wherein the LED assembly includes a plurality of LEDs and an LED printed circuit board (PCB), and wherein the LED PCB includes a first region on which the plurality of LEDs are mounted, and a second region is soldered with a flexible printed circuit (FPC) to supply power to the plurality of LEDs; a main supporter that is made of an insulating material, that surrounds the liquid crystal panel and the backlight unit, and that includes a placement portion, on which the liquid crystal panel is, and a hole into which a top portion of the second region is inserted; a bottom case that is made of metal and that is coupled with the main supporter, wherein a portion of the bottom case facing the soldered portion of the LED PCB is removed; and a top case that is made of metal, that surrounds peripheral portions of the liquid crystal panel, and that surrounds and is coupled with the main supporter and the bottom case.

5 Claims, 6 Drawing Sheets

29a
29b
29
first insulating tape 50    second insulating tape damage due to short circuit

LIQUID CRYSTAL DISPLAY MODULE

The present invention claims the benefit of Korean Patent Application No. 10-2009-0128363, filed in Korea on Dec. 21, 2009, which is hereby incorporated by reference for all purposes as if fully set forth herein.

BACKGROUND OF THE INVENTION

1. Field of the Invention

The present invention relates to a liquid crystal display module, and more particularly, to a liquid crystal display module including light emitting diodes (LEDs).

2. Discussion of the Related Art

Until recently, display devices have typically used cathode-ray tubes (CRTs). Presently, many efforts and studies are being made to develop various types of flat panel displays, such as liquid crystal displays (LCDs), plasma display panels (PDPs), field emission displays, and electro-luminescence displays (ELDs), as a substitute for CRTs. Of these flat panel displays, LCDs have many advantages, such as high resolution, light weight, thin profile, compact size, and low voltage power supply requirements.

In general, an LCD includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD. Thus, the LCD displays images by varying the intensity of the induced electric field.

The LCD includes a backlight unit to supply light to a liquid crystal panel. Recently, as a light source of the backlight unit, light emitting diodes (LEDs) are widely used.

FIG. 1 is a cross-sectional view illustrating an LCD module according to the related art.

Referring to FIG. 1, the LCD module 1 includes a liquid crystal panel 10, a backlight unit 20, a main supporter 30, a top case 40 and a bottom case 50.

The liquid crystal panel 10 includes first and second substrates 12 and 14 facing each other, and a liquid crystal layer therebetween.

The backlight unit 20 is located below the first substrate 12. The backlight unit includes a LED assembly 29, a reflector 25, a light guide plate 23 and at least one optical sheet 21.

The LED assembly 29 is configured along a side of the light guide plate 23. The LED assembly 29 includes a plurality of LEDs 29a emitting white light and a LED printed circuit board (PCB) 29b. The plurality of LEDs 29a are mounted on the LED PCB 29b.

The reflector 25 is located on the bottom case 50, the light guide plate 23 is located on the reflector 25, and the at least one optical sheet 21 is located on the light guide plate 23.

The main supporter 30 surrounds the liquid crystal panel 10 and the backlight unit 20. The main supporter 30 is coupled with the top case 40 covering peripheral portions of the liquid crystal panel 10 and the bottom case 50 covering a bottom portion of the backlight unit 20. Through assembling the above components, the LCD module 1 is completed.

Further, polarizing films 19a and 19b are attached onto bottom and top surfaces, respectively, of the liquid crystal panel 10.

A position of the LED assembly 29 is fixed through a method such as an adhesion and the like so that the LEDs 29a face a light entering surface of the light guide plate 23. To do this, a side portion of the bottom case 50 is bent upward, and the LED assembly 29 is attached onto the bent side portion through an adhesive such as a double-sided adhesive tape. This structure may be referred to as a side top-view type.

In this structure, light emitted from the LEDs 29a is incident on the light entering surface of the light guide plate 23 then is refracted in the light guide plate 23 toward the liquid crystal panel 20. This light along with light reflected by the reflector 25 is processed into high-quality uniform plane light while passing through the optical sheet 21 then is supplied to the liquid crystal panel 20.

Although not shown in the drawings, a soldering portion is formed at an outer surface of an end portion of the LED PCB 29b. A FPC (flexible printed circuit) to supply power for the LED PCB 29b is coupled with the LED PCB 29b through the soldering portion. However, since the soldering portion contacts a side portion of the bottom case 50 made of metal, a short circuit defect is caused.

To prevent the short circuit defect, a method using an insulating tape is proposed. FIG. 2 is a view illustrating the case that a first insulating tape is attached onto the soldering portion in the LCD module according to the related art, and FIG. 3 is a view illustrating the case that a second insulating tape is attached onto a portion of the bottom case of the LCD module according to the related art.

Referring to FIG. 2, a first insulating tape referred to as a Kapton tape is attached onto the soldering potion. Alternatively, referring to FIG. 3, a second insulating tape referred to as a Teraoka tape is attached onto a portion of the bottom case 50 corresponding to the soldering portion.

However, processes of attaching the first and second insulating tapes are all performed by a worker. Accordingly, difference of the process time is caused according to the worker's skill, and caused is difference of rate of product error due to the insulating tapes coming off in assembling process after attaching the insulating tapes.

Further, the first and second insulating film are expensive, thus production costs increase.

Further, the soldering portion, the bottom case 50 and the insulating tape therebetween forms a capacitor. Accordingly, high capacitance may occur, and this causes a short circuit or spark. Accordingly, the LED PCB 29b is caused to be damaged, or the FPC 70, which is connected to the LED PCB 29b via the soldering portion, is caused to be damaged, as shown in FIG. 4, and thus the backlight unit is malfunctioned.

Further, as time goes by, the insulating film becomes worn because of frequent friction between the insulating film and both of the soldering portion and the bottom case 50, and insulating property of the insulating film is thus reduced. This causes a short circuit defect.

Further, due to the insulating film, thickness of the soldering portion increases. Accordingly, after assembling process, the light guide plate is caused to be pushed out. Thus, light leakage occurs at a display region near the LED.

SUMMARY OF THE INVENTION

Accordingly, the present invention is directed to an LCD module that substantially obviates one or more of the problems due to limitations and disadvantages of the related art.

An advantage of the present invention is to provide an LCD module that can reduce production costs and product reliability.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display (LCD) module includes: a liquid crystal panel; a backlight unit that is below the liquid crystal panel and that includes a reflector, a light guide plate, at least one optical sheet and a light emitting diode (LED) assembly, wherein the LED assembly includes a plurality of LEDs and an LED printed circuit board (PCB), and wherein the LED PCB includes a first region on which the plurality of LEDs are mounted, and a second region is soldered with a flexible printed circuit (FPC) to supply power to the plurality of LEDs; a main supporter that is made of an insulating material, that surrounds the liquid crystal panel and the backlight unit, and that includes a placement portion, on which the liquid crystal panel is, and a hole into which a top portion of the second region is inserted; a bottom case that is made of metal and that is coupled with the main supporter, wherein a portion of the bottom case facing the soldered portion of the LED PCB is removed; and a top case that is made of metal, that surrounds peripheral portions of the liquid crystal panel, and that surrounds and is coupled with the main supporter and the bottom case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 1:
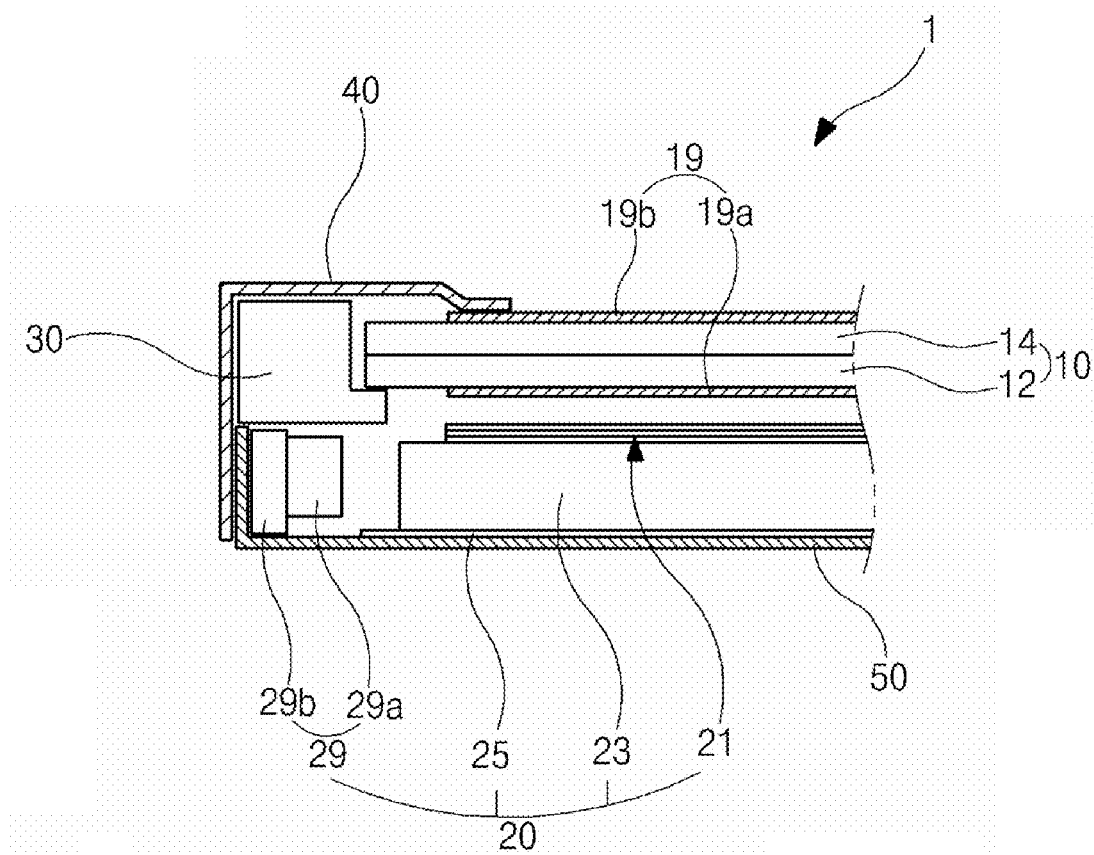
FIG. 1 is a cross-sectional view illustrating an LCD module according to the related art.
Figure 2:
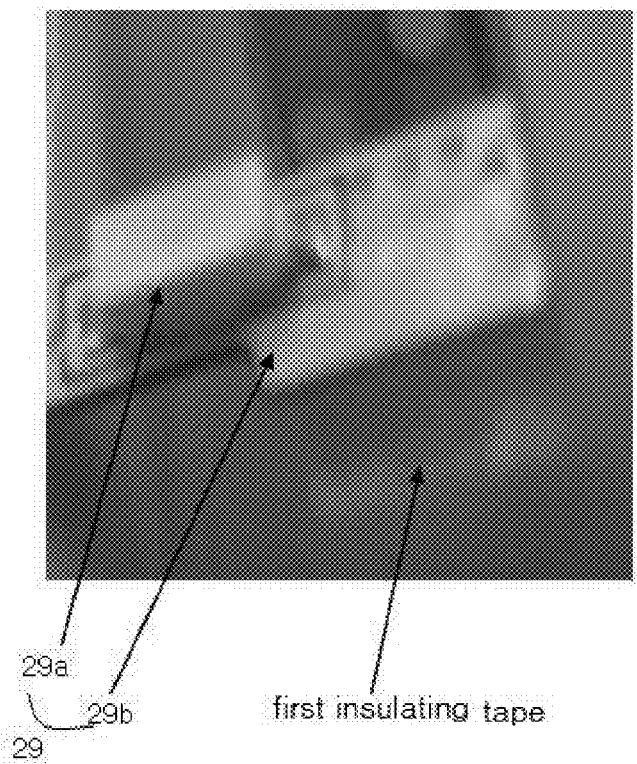
FIG. 2 is a view illustrating the case that a first insulating tape is attached onto the soldering portion in the LCD module according to the related art.
Figure 3:
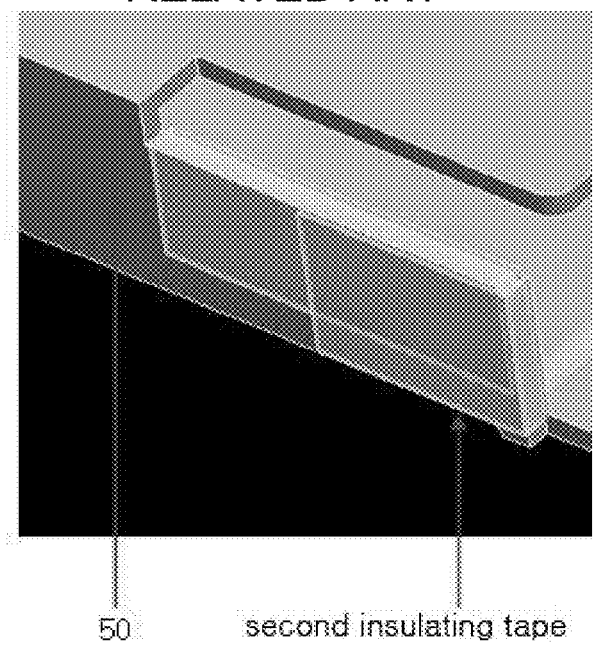
FIG. 3 is a view illustrating the case that a second insulating tape is attached onto a portion of the bottom case of the LCD module according to the related art.
Figure 4:
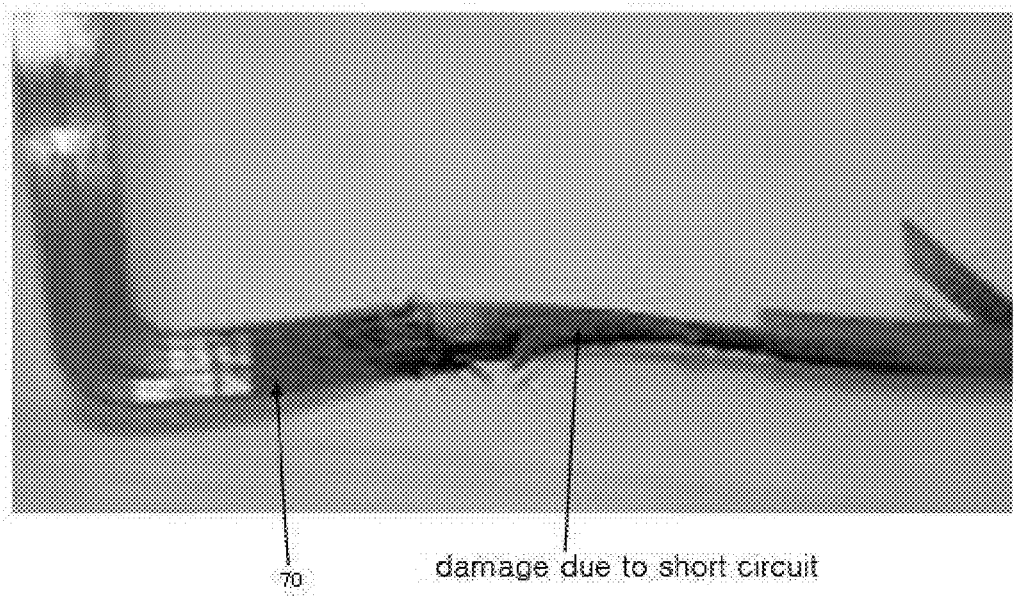
FIG. 4 is a picture illustrating a FPC damaged due to a short circuit.
Figure 5:
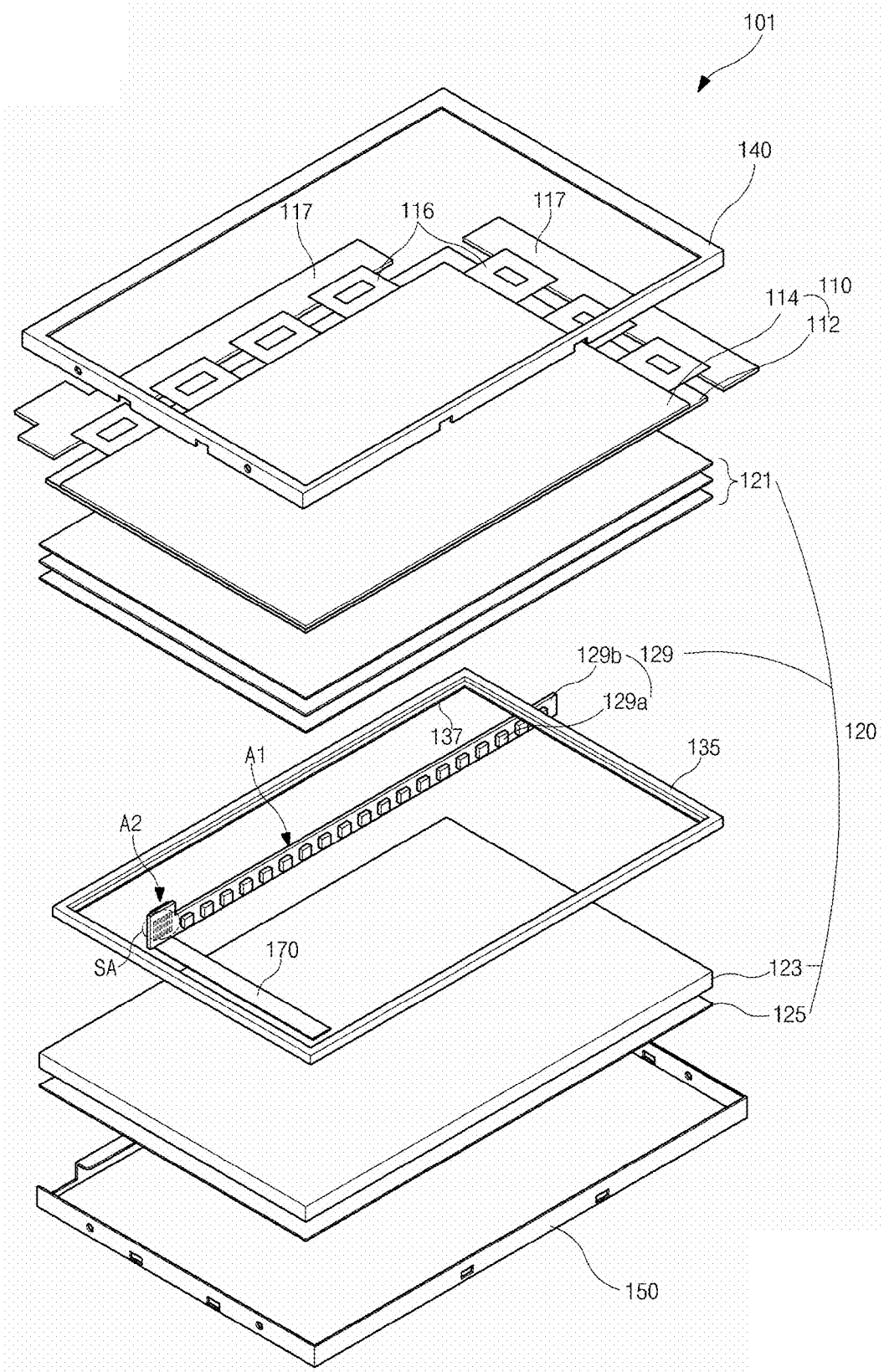
FIG. 5 is an exploded perspective view illustrating an LCD module according to an embodiment of the present invention.
Figure 6A:
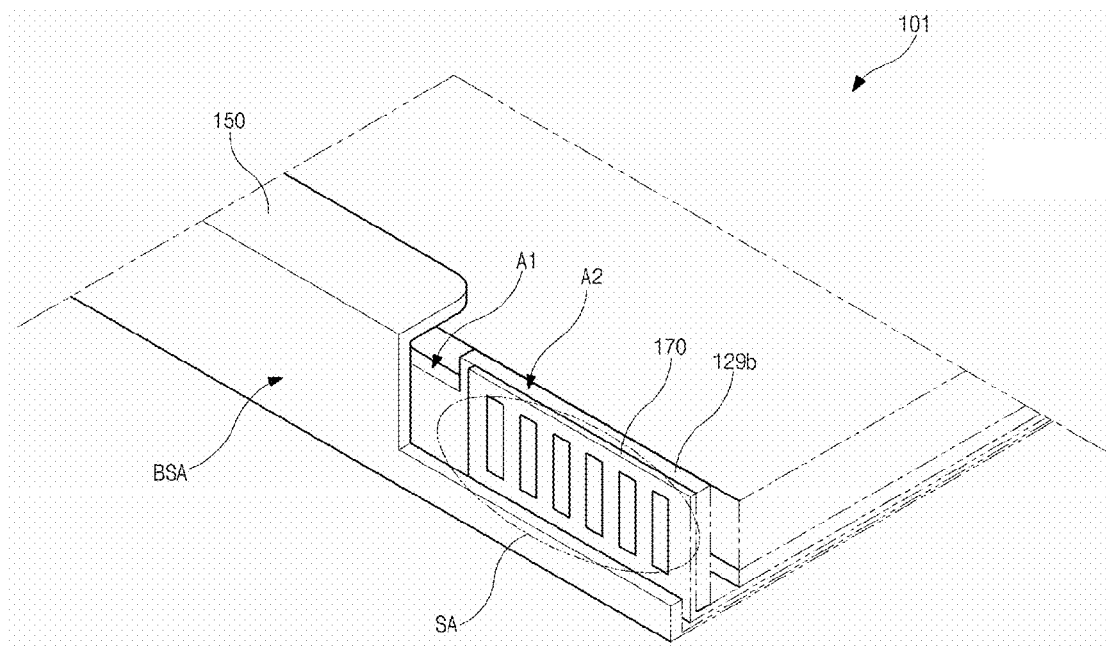
FIG. 6A is a perspective view illustrating a portion of the LCD module, in the case that a main supporter is not employed, according to the embodiment of the present invention.
Figure 6B:
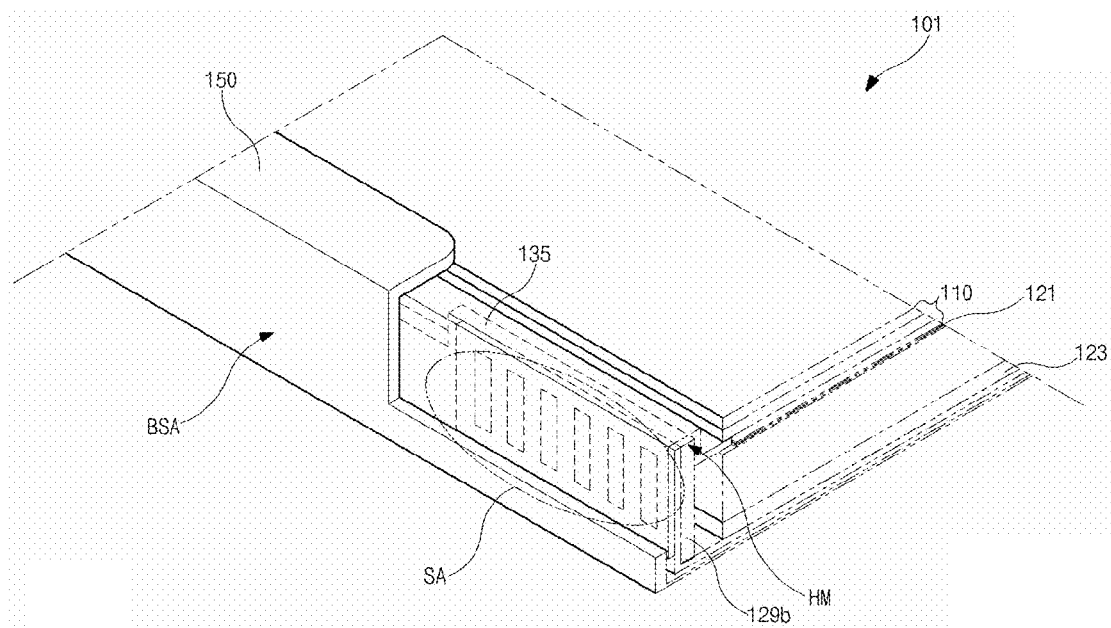
FIG. 6B is a perspective view illustrating a portion of the LCD module, in the case that a main supporter is employed, according to the embodiment of the present invention.
Figure 7:
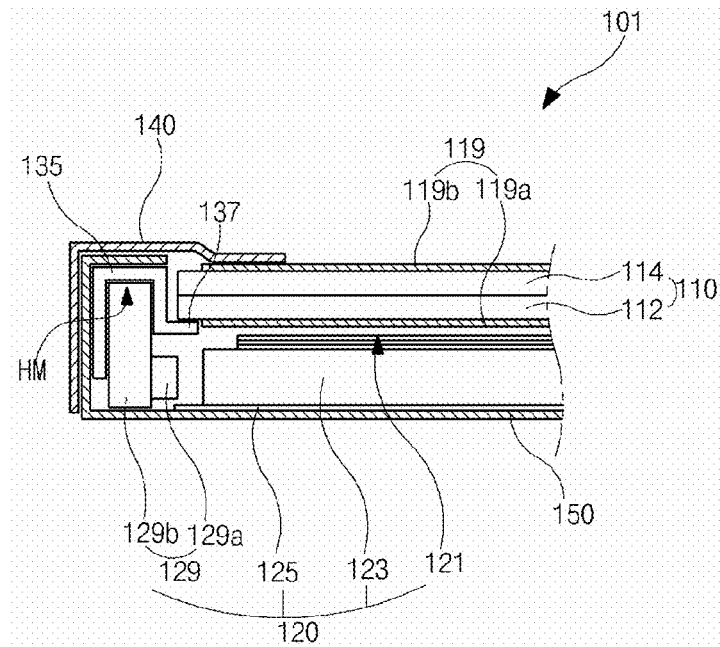
FIG. 7 is a cross-sectional view illustration a portion, where a soldering portion is formed, the LCD module according to the embodiment.

FIG. 5 is an exploded perspective view illustrating an LCD module according to an embodiment of the present invention, FIG. 6A is a perspective view illustrating a portion of the LCD module, in the case that a main supporter is not employed, according to the embodiment of the present invention, FIG. 6B is a perspective view illustrating a portion of the LCD module, in the case that a main supporter is employed, according to the embodiment of the present invention, and FIG. 7 is a cross-sectional view illustration a portion, where a soldering portion is formed, the LCD module according to the embodiment.

Referring to FIGS. 4 to 7, the LCD module 101 includes a liquid crystal panel 110, a backlight unit 120, a main supporter 135, a top case 140 and a bottom case 150.

The liquid crystal panel 110 includes a first substrate 112 and a second substrate 114 facing each other, and a liquid crystal layer therebetween. The first substrate 112 may include gate and data lines crossing each other to define a pixel region, a thin film transistor connected to the gate and data lines, and a pixel electrode in the pixel region. The first substrate 112 is referred to as an array substrate.

The second substrate 114 may include color filters, for example, red (R), green (G) and blue (B) color filters in the respective pixel regions, a black matrix between neighboring pixel regions, and a common electrode on the color filters and the black matrix. The second substrate 114 is referred to as a color filter substrate.

Although not shown in the drawings, polarizing films may be located on outer surfaces of the first and second substrates 112 and 114, respectively.

At least one printed circuit board (PCB) 117 is connected to at least a side portion of the liquid crystal panel 110 through a corresponding flexible film, for example, a tape carrier package (TCP) film 116. In assembling process, the TCP film 116 is bent so that the PCB 117 is located on a side of the main supporter 135 or on a bottom of the bottom case 150.

A gate driving circuit sequentially selects the gate lines and outputs a gate voltage to the selected gate line, thus the thin film transistor connected to the selected gate line is turned on. A data driving circuit outputs data voltages to the respective data lines, and the data voltages are applied to the respective pixel electrodes. Accordingly, an electric field is induced between the pixel electrode and the common electrode, and alignment of the liquid crystal molecules is changed. Thus, the light transmissivity of the liquid crystal panel 110 is changed. Therefore, the liquid crystal panel 110 displays images by varying the intensity of the induced electric field.

The backlight unit 120 supplies light to the liquid crystal panel 110. The backlight unit 120 includes an LED assembly 129, a reflector 125, a light guide plate 123 on the reflector 125, and at least one optical sheet 121 on the light guide plate 123. The reflector 125 may be white or silver.

The LED assembly 129 is configured such that it faces a side surface i.e., a light entering surface of the light guide plate 123. The LED assembly 129 includes a plurality of LEDs 129a and an LED PCB 129b on which the LEDs 129a are mounted along the length direction of the LED PCB 129b. The LED PCB 129b may control turn-on/off the LEDs 129a. The LED PCB 129b may include a first region A1, where the LEDs 129a are mounted, and a second region A2 at an end of the LED PCB 129b. The first region A1 has a first width and the second region A2 has a second width more than the first width.

The second region A2 is configured for connection with a FPC 170 to supply power for the LEDs 129a. A soldering portion SA is formed at an outer surface of the second region A2 through a soldering using a material such as lead. At the soldering portion SA, a conductive protrusion portion, for example, a metal protrusion portion is formed through the soldering.

The LEDs 129a may include red (R), green (G) and blue (B) LEDs emitting red, green and blue lights, respectively. When the red, green and blue LEDs are simultaneously turned on, the red, green and blue lights are mixed into white light.

Alternatively, the LEDs 129a may include LEDs 129a emitting white light. For example, the white LED includes three LED chips emitting red, green and blue lights, respectively, thereby emitting white light, or includes a LED chip emitting the white light.

The LEDs 129a may be arranged in at least one line along the length direction of the LED PCB 129b.

In the embodiment, the LED assembly 129 is fixed through the main supporter 135. To do this, the main supporter 135 may include a hole HM at a side portion of the main supporter 135. At least portion of the second region A2, which is soldered with the FPC 170, is inserted into the hole HM. Accordingly, the LED PCB 129b is firmly fixed and prevented from moving. The hole HM may be defined by a top part and side parts of the side portion of the main supporter 135. The main supporter 135 may be made of an insulating material and have an elastic property. The outer side part of the main supporter 135 defining the hole HM may contact the soldering portion SA.

A light incident on the light guide plate 123 is totally reflected and uniformly spreads over the light guide plate 123, and thus uniform plane light is emitted from the light guide plate 123 toward the liquid crystal panel 110. To emit more uniform plane light, a specific pattern may be formed at the bottom of the light guide plate 123. For example, an elliptical pattern, a polygonal pattern, a hologram pattern and the like are formed. The pattern may be formed through a printing method or injection molding method.

The reflector 125 is located below the light guide plate 123 and reflects light back toward the liquid crystal panel 110. Accordingly, light utilization efficiency and brightness can be improved.

The at least one optical sheet 121 may include a diffusion sheet and at least one prism sheet. The optical sheet 121 functions to diffuse and concentrate light thus supply more uniform plane light to the liquid crystal panel 110.

The liquid crystal panel 110 and the backlight unit 120 are modularized through the main supporter 135, the top case 140 and the bottom case 150. The top case 140 has a frame shape and surrounds peripheral portions of the liquid crystal panel 110. A display region of the liquid crystal panel 110 is open through an opening of the top case 140.

The liquid crystal panel 110 and the backlight unit 120 are placed on the bottom case 150. The bottom case 150 may have a bottom portion and side portions. The side portions of the bottom case 150 are bent upward from the bottom portion of the bottom case 150 and have a first height with respect to the bottom portion of the bottom case 150.

Among the side portions of the bottom case 150, a side portion BSA, on which the LED PCB 129b is located, may be doubly bent. The side portion of the main supporter 135 may be inserted into the inside of the side portion BSA. For example, the side portion BSA includes a side part bent from the bottom portion of the bottom case 150, and a top part bent from the side part. A portion of the doubly-bent side portion BSA corresponding to the soldering portion SA is cut off so that the soldering portion SA is not covered by the side portion BSA.

In more detail, the top part of the side portion BSA over the top of the soldering portion SA may be completely removed, and the side part of the side portion BSA facing the soldering portion SA is partially removed. Accordingly, the side part of the side portion BSA facing the soldering portion SA has a second height less than the first height. The metal protrusion portion of the soldering portion SA is substantially positioned higher than the second height. In other words, the metal protrusion portion is substantially positioned higher than the second height of the side portion BSA corresponding to the soldering portion SA. Therefore, the metal protrusion portion does not contact the bottom case 150 of metal.

The side portion BSA having the second height is formed to prevent a bending that may be produced in the case that it is not formed and only the bottom portion exists at the position.

The side portion of the main supporter 135 is substantially inserted inside the side portion BSA of the bottom case 150, and the outer side part of the side portion of the main supporter 135 is located on the outer surface of the soldering portion SA. Further, the top portion of the soldering portion SA is inserted into the hole HM of the main supporter 135. Accordingly, the LED PCB 129b does not move and is fixed.

The main supporter 135 has a frame shape and surrounds the liquid crystal panel 110 and the backlight unit 120. The main supporter 135 includes a placement portion 137 which substantially divides between a position of the liquid crystal panel 110 and a position of the backlight unit 120. The main supporter 135 is coupled with the top case 140.

The first region A1 of the LED PCB 129b may be attached onto inner surfaces of the bottom case 150, for example, through an adhesive tape, or onto inner surfaces of the side portion of the main supporter 135 inserted inside the side portion BSA, for example, through an adhesive tape. The top portion of the second region A2 of the LED PCB 129b is inserted into the hole HM, as described above. Since the second region A2 has the width more than the first region A1, the second region A2 is inserted into the hole HM and effectively fixed.

When the LED PCB 129b is attached onto the side portion BSA of the bottom case 150, an effective heat radiation can be obtained. Further, as described above, the bottom case 150 corresponding to the soldering portion SA is removed, and the soldering portion SA is insulated from the bottom case 150 by the main supporter 135 between the bottom case 150 and the soldering portion SA. Therefore, the short circuit defect between the soldering portion SA and the bottom case 150 can be prevented.

When the LED PCB 129b is attached onto the side portion of the main supporter 135, the LED PCB 129b is insulated from the side portion BSA of the bottom case 150 by the side portion of the main supporter 135. This structure can also prevent the short circuit between the LED PCB 129b and the bottom case 150.

The liquid crystal panel 110 may be placed on the placement portion 137 of the main supporter 135.

The side portion BSA of the bottom case 150 may be coupled with the top case 140.

The soldering portion SA is covered by the top case 140. The top case 140 is located outside the bottom case 150 thus spaced apart from the soldering portion SA. Since the main supporter 135 covers the soldering portion SA, the soldering portion SA is still insulated from the top case 140.

Figure 8:
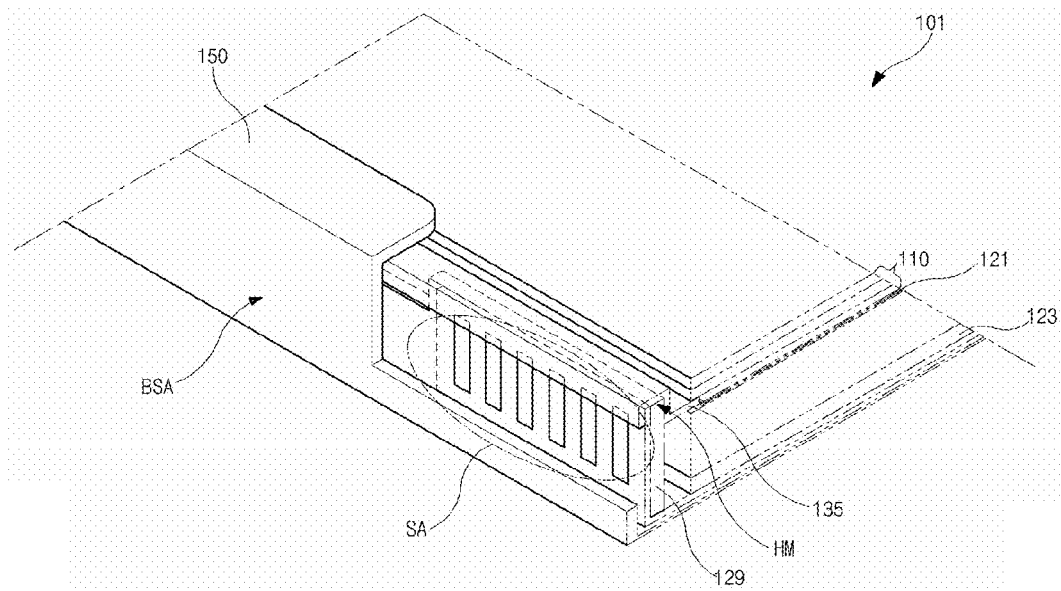
FIG. 8 is a perspective view illustrating a portion of an LCD module according to another embodiment.

FIG. 8 is a perspective view illustrating a portion of an LCD module according to another embodiment. Explanations of parts similar to parts of the FIGS. 5-7 may be omitted.

Referring to FIG. 8, at least one of a portion of the top case 140 and a portion of the side portion of the main supporter 135 corresponding to the soldering portion SA may be removed. In this case, a component made of metal may not exist at a position facing the soldering portion SA. Accordingly, a capacitor formed by metal/insulator/metal is substantially prevented. Therefore, prevented can be damage to the LED PCB 129b or FPC 170 due to occurrence of short circuit or spark by a sudden capacitance variation when applying power through the FPC 170.

As described above, in the embodiments, it is not needed to attach an insulating tape to the soldering portion SA for insulation of the soldering portion SA. Accordingly, thickness increase of the side portion of the LCD module 101 due to the insulating tape can be prevented.

Further, since the second region A2 is inserted into the hole HM of the main supporter 135 and its position is fixed, a problem that the light guide plate 123 is pushed out due to the movement of the LED PCB 129b can be prevented. Therefore, light leakage due to the pushed-out problem can be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) module, comprising:
   a liquid crystal panel;
   a backlight unit that is below the liquid crystal panel and that includes a reflector, a light guide plate, at least one optical sheet and a light emitting diode (LED) assembly, wherein the LED assembly includes a plurality of LEDs and an LED printed circuit board (PCB), and wherein the LED PCB includes a first region on which the plurality of LEDs are mounted, and a second region is soldered with a flexible printed circuit (FPC) to supply power to the plurality of LEDs;
   a main supporter that is made of an insulating material, that surrounds the liquid crystal panel and the backlight unit, and that includes a placement portion, on which the liquid crystal panel is, and a hole into which a top portion of the second region is inserted;
   a bottom case that is made of metal and that is coupled with the main supporter, wherein a portion of the bottom case facing the soldered portion of the LED PCB is removed; and
   a top case that is made of metal, that surrounds peripheral portions of the liquid crystal panel, and that surrounds and is coupled with the main supporter and the bottom case.

2. The module according to claim 1, wherein a portion of the top case corresponding to the soldered portion of the LED PCB is removed.

3. The module according to claim 1, wherein a side portion of the main supporter covers at least portion of the soldered portion of the LED PCB.

4. The module according to claim 1, wherein the LED PCB has an adhesive at an outer surface thereof to attach the LED PCB to an inner surface of a side portion of the bottom case or to an inner surface of a side portion of the main supporter.

5. The module according to claim 4, wherein a portion of the side portion of the bottom case corresponding to the first region of the LED PCB has a first height, and a portion of the side portion of the bottom case corresponding to the second region of the LED PCB has a second height less than the first height.

* * * * *